(No Model.)

G. W. N. YOST.
TYPE WRITING MACHINE.

No. 450,806. Patented Apr. 21, 1891.

Attest:
Andrew W. Steger.
Martin Layden.

Inventor:
George W. N. Yost
By Jacob Felbel.
Att'y.

UNITED STATES PATENT OFFICE.

GEORGE W. N. YOST, OF NEW YORK, N. Y., ASSIGNOR TO THE YOST WRITING MACHINE COMPANY, OF SAME PLACE.

TYPE-WRITING MACHINE.

SPECIFICATION forming part of Letters Patent No. 450,806, dated April 21, 1891.

Application filed May 18, 1889. Serial No. 311,300. (No model.)

*To all whom it may concern:*

Be it known that I, GEORGE W. N. YOST, a citizen of the United States, and a resident of New York city, in the county of New York and State of New York, have invented certain new and useful Improvements in Type-Writing Machines, of which the following is a specification.

In the use of type-writing machines of the bar or lever class it is desirable to have some means whereby the impression-point, or that locality at which the type-bars or levers all strike or print upon the paper, may be readily ascertained, for the purpose of facilitating the reduction to order in columns or series of lists, inventories, catalogues, bills of account, &c., and in order that corrections in the work may be readily made.

Previous to my invention contrivances have been provided by others for the attainment of the ends above referred to. In one case it has been common to employ a graduated scale on the frame-work of the machine, and to use in connection therewith on the paper-carriage a similar device, but reversely graduated. In another case it has been suggested to employ an index or pointer at the center of the machine, which, when the paper-carriage is raised, the operator may by hand turn up to or against the platen or the paper thereon, to indicate any particular portion thereof, which will lie in line or register with the common center of the type-carriers when the paper-carriage is lowered or turned down to its working position.

My invention relates to this last-mentioned kind of means for locating the impression-point, and has for its main object to simplify the construction and improve the operation thereof; and to this end it consists in combining with a platen a hinged or pivoted pointer or index, which, when the platen is moved to expose the line being written, automatically moves or swings up to indicate the impression-point, and in other combinations of parts and features of construction, all as will be hereinafter more fully described, and particularly pointed out in the appended claims.

Figure 1:
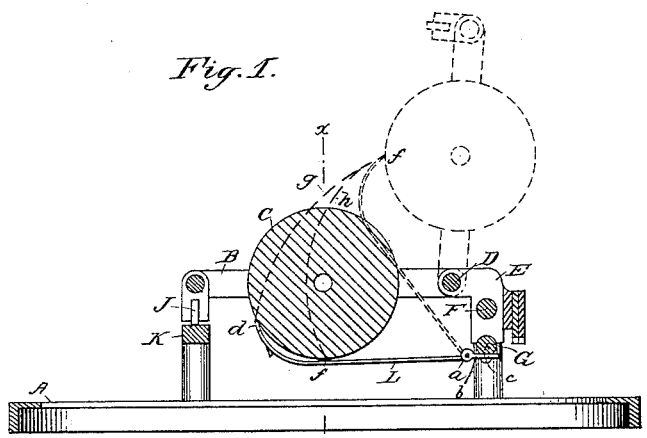
Figure 2:
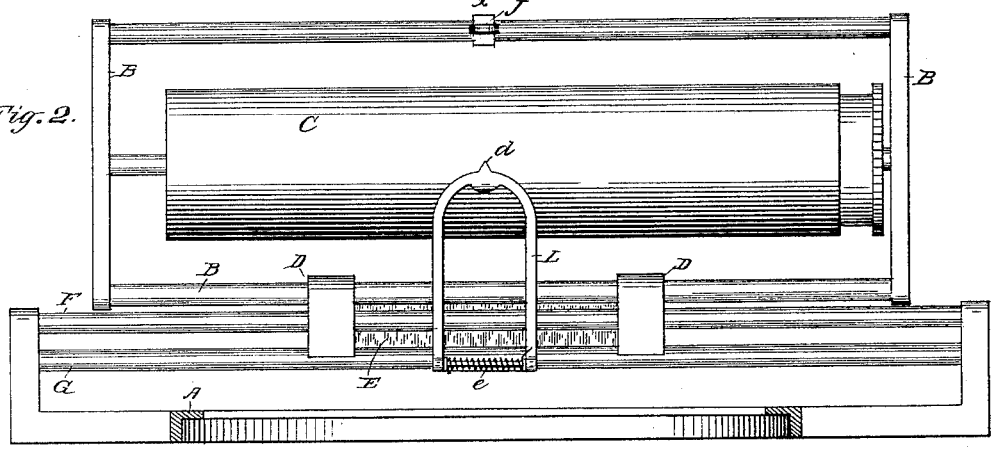
Figure 5:
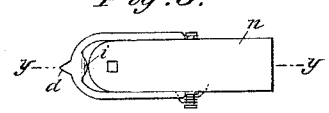
Figure 3:
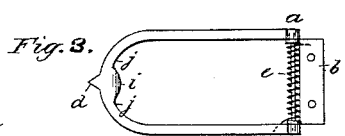
Figure 6:
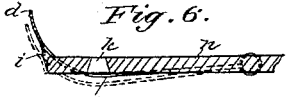
Figure 7:
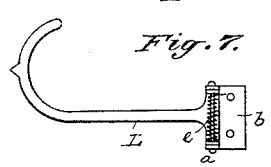
Figure 4:
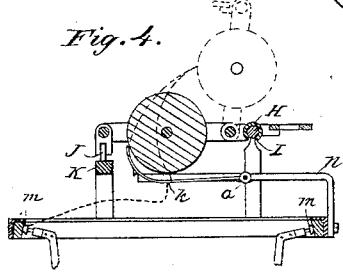

In the accompanying drawings, Figure 1 is a central vertical section of a portion of a type-writing machine embodying my invention. Fig. 2 is a vertical transverse section taken at the line $x\, x$ of Fig. 1, with the paper-carriage turned up. Fig. 3 is a plan view of the indicator detached. Fig. 4 is a view similar to that shown at Fig. 1, with the indicator attached in a different manner. Fig. 5 is a plan view of the indicator as attached at Fig. 4. Fig. 6 is a vertical section taken at $y\, y$, Fig. 5. Fig. 7 is a plan view of a modification of the indicator.

In the several views the same part will be found designated by the same letters of reference.

A represents the usual type-ring or top plate of a type-writing machine of the bar or lever class, and B the paper-carriage, provided, as usual, with a cylindrical revoluble platen C. The paper-carriage is hinged at D, to enable it to be lifted or swung up to the position shown at Fig. 2 in full lines and Fig. 1 in dotted lines, for the well-known purposes. The paper-carriage may be guided in its movements across the machine by any suitable means. At Figs. 1 and 2 the carriage is shown as guided by a yoke-piece E and two parallel rails F G, while at Fig. 4 the guiding devices consist of an inverted split tube H and a single rod or rail I. At the front portion the carriage may be provided with the usual roller or wheel J, to travel on the track or way K.

Referring now more particularly to Figs. 1, 2, and 3, L represents the indicator or index, which is hinged or pivoted at $a$ to a plate or bar $b$, fastened by screws $c$ or otherwise to the under side of the rail G. The indicator is made in the shape of the letter U, and is provided with a point or finger $d$. A spring $e$ is provided at the hinge or pivot of the indicator to elevate the same. The forward end of the indicator rests or bears against the platen or the paper thereon when the platen is down in working position, as shown in full lines at Fig. 1. In this position of the platen the point or finger $d$ of the indicator extends beyond the printing or impression point $f$ of the machine, and the type are adapted to enter between the side arms of the indicator-frame and strike the paper upon the platen. When the platen is lifted or swung up to the position shown at Fig. 2, the index or indicator follows along with it automatically by reason of the presence of the spring $e$. As the platen is turned up the front portion of the indicator or the finger $d$ swings in the arc $g$ and the impression-point of the platen moves in the arc $h$. When the platen has been fully turned up, as shown by the dotted lines, the front portion of the indicator or the finger $d$ has arrived at or opposite the printing or impression point. In the turned-up position of the platen the point of the finger may or may not touch the paper being written upon and stands at the bottom of the line of printing. When the platen is turned down to a working position, the indicator is carried down with and by it automatically against the tension of the spring $e$, and is held in a depressed condition during the operation of writing by reason of the superiority of the weight of the platen and its carrier to the tension or force of the spring which lifts the indicator. The forward end of the indicator is curved or bent to conform substantially with the curvature of the platen, and is provided or formed with a downwardly-extending lip $i$ for the purpose of avoiding any contact of the paper with the inner edges $j$ of the indicator-frame. Without this lip there is a liability of the leading edge of the paper, if slightly buckled or crinkled, getting caught on the indicator-frame when the paper is first inserted or fed to the platen while the latter is down or in a working position. The presence of this lip I have found in practice effectually obviates the objection alluded to. It operates as a deflector or guide and causes the edge of the sheet to ride up over the front bar or portion of the indicator frame.

Referring now particularly to Figs. 4, 5, and 6 it will be observed that the indicator is applied in a little different manner and to a different construction of type-writing machine. The machine illustrated in part at Fig. 4 is that known as the "Yost" machine, employing a center guide $k$ for the type $m$. This guide or directrix is formed or provided in an arm or bracket or holder $n$, attached to the top plate of the machine at the rear and projecting inwardly beneath the plane of the platen sufficiently to support the guide at the center of the radiating type-carriers or in line with the printing or impression point. In said Yost machine the indicator is pivoted or hinged to the said guide arm or holder, instead of to the carriage guide-rail, as shown at Figs. 1 and 2. The indicator is provided with a spring, as before, to automatically lift it when the platen is turned up, and the forward end of the indicator projects beyond the free end of the guide-holder. In connection with the guide-holder the lip $i$ performs an additional function to that above described—namely, that of a lock or catch for the indicator. It may be made to serve this function simply by pushing down upon the indicator, as shown by the dotted lines at Fig. 6. By thus depressing the indicator the lip is caused to engage frictionally with the end of the guide-holder and by the contact merely of the surfaces hold the indicator down out of working position. This locking or holding of the indicator in a manner to prevent the spring $e$ from acting is provided for in order, first, that the carriage may be removed, and, secondly, that the platen may be lifted without the indicator following up after it. When it is desired to remove the carriage from the Yost machine, the indicator must be fastened or held down against the force of its operating means; otherwise it will catch upon some part of the carriage and be damaged or else prevent the removal of the carriage. When it is desired to make corrections in the work while on the platen, it is sometimes desirable to prevent the rise of the indicator when the platen is swung up in order that more room may be afforded the operator for making erasures, &c. The lip $i$ is adapted to co-operate with the arm in a manner to securely hold down the indicator when it is desired to prevent the rising of the latter under the influence of its actuating-spring.

At Fig. 7 is shown a modified construction of indicator adapted to the machine illustrated at Fig. 1, and consisting of a single spring-actuated vibratory arm.

In the various ways in which my invention is shown carried out it will be observed that the indicator is hinged or pivoted eccentrically of the plane of the pivot or hinge of the platen-carriage and in rear of the platen, so that the finger $d$ may stand under the platen in front of the impression-point and out of the way when the platen is down and writing being done, and may be moved to the impression-point of the platen when the latter has been turned up to the dotted line position shown at both Figs. 1 and 4. This is an important relative arrangement of the parts, as is also the pivoting of the indicator in a plane back of that occupied by the hinge of the paper-carriage, by which I am enabled to keep the finger $d$ well down, so as not to cover or hide any portion of the writing at the front when the platen is down, and so as not to be in the way of the usual paper-guides, &c., on the paper-carriage at its front.

The use of the index has been already indicated; but I may remark here that it is employed to denote the point or locality at which, when the platen is turned down, a type will make its impression or mark if a finger-key be struck or actuated. Thus the insertion of omitted characters may be performed with great facility, and the writing may be begun or resumed at the exact point desired or required.

Numerous changes in detail construction may be made without departing from the spirit of my invention. The arm or support $n$ for the indicator may be made shorter than shown and be unprovided with a type-guide.

The gist of one part of my invention rests in combining with the platen an indicator which shall move automatically to the printing-point when the platen has been turned or moved to expose the same.

What I claim as new, and desire to secure by Letters Patent, is—

1. In a type-writing machine, the combination, with a hinged platen-carrier, of an indicator arranged below the platen and contiguous thereto and constructed to rise automatically when the platen is turned to expose the printing or impression point, substantially as set forth.

2. In a type-writing machine, the combination, with a hinged platen-carrier, of a hinged or pivoted indicator arranged beneath and contiguous to the platen when the latter is down in working position, and means, substantially as described, for automatically moving the same when the platen is turned to expose the printing or impression point, substantially as set forth.

3. In a type-writing machine, the combination, with a hinged platen-carrier, of an indicator and a spring, the said spring operating to press the indicator against the platen when in a working position and to cause the indicator to follow the platen when the latter is turned to expose the printing or impression point, substantially as set forth.

4. In a type-writing machine, the combination, with a platen and a spring, of an intermediately-arranged indicator, whereby the indicator is adapted to be moved in one direction by the spring and in the opposite direction by the platen, substantially as set forth.

5. In a type-writing machine, the combination of a hinged platen-carrier, an indicator pivoted at a point back of the hinge of the platen-carrier and below the same and extending forward beyond the printing-point of the platen, and means for causing the indicator to automatically follow the platen as its carrier is swung or vibrated about its hinge or axis of motion, substantially as set forth.

6. In a type-writing machine, the combination of the platen, an inwardly-extending arm, an indicator pivoted to said arm, and a spring for moving the indicator, substantially as set forth.

7. In a type-writing machine, the combination of the platen, an inwardly-extending arm, and an indicator provided with a catch for engagement with said arm, substantially as set forth.

8. In a type-writing machine, the combination of the platen, an inwardly-extending arm, an indicator provided with a lip, and a spring, substantially as set forth.

9. In a type-writing machine, the combination of a platen, an inwardly-extending arm, an indicator pivoted to said arm and projecting beyond the forward end of the same, and a spring for moving said indicator, substantially as set forth.

10. In a type-writing machine, the combination of the platen, the U-shaped indicator provided with a finger, and a spring for holding the indicator against the platen, substantially as set forth.

11. In a type-writing machine, the combination of the hinged platen-carrier and a vibratory indicator hinged or pivoted eccentrically of and in rear of the pivotal point of the platen-carrier and bent or curved at its free end to conform substantially with the curvature of the platen, substantially as set forth.

12. In a type-writing machine, the combination of the platen, the top plate, the arm attached thereto, the indicator pivoted to said arm, and the actuating-spring, substantially as set forth.

Signed at New York, in the county of New York, and State of New York, this 15th day of May, A. D. 1889.

GEORGE W. N. YOST.

Witnesses:
EDWIN C. DUSENBURY,
JACOB FELBEL.